United States Patent
Samuelson et al.

(10) Patent No.: US 12,281,981 B2
(45) Date of Patent: Apr. 22, 2025

(54) DETERMINING CELLULOSE AND PLASTIC RATIOS USING NEAR-INFRARED SPECTROSCOPY ALONG THE EDGE OF COMPOSITE PANELS

(71) Applicant: Continuus Materials Intellectual Property, LLC, The Woodlands, TX (US)

(72) Inventors: Brady Samuelson, Des Moines, IA (US); Brian McQuerrey, Sarasota, FL (US)

(73) Assignee: Continuus Materials Intellectual Property, LLC, The Woodlands, TX (US)

( * ) Notice: Subject to any disclaimer, the term of this patent is extended or adjusted under 35 U.S.C. 154(b) by 260 days.

(21) Appl. No.: 18/128,572

(22) Filed: Mar. 30, 2023

(65) Prior Publication Data
US 2024/0094119 A1 Mar. 21, 2024

Related U.S. Application Data

(60) Provisional application No. 63/407,240, filed on Sep. 16, 2022.

(51) Int. Cl.
*G01N 21/3563* (2014.01)
*G01N 21/359* (2014.01)

(52) U.S. Cl.
CPC ....... *G01N 21/3563* (2013.01); *G01N 21/359* (2013.01); *G01N 2201/127* (2013.01)

(58) Field of Classification Search
CPC ............. G01N 21/3563; G01N 21/359; G01N 2201/127; G01N 21/274; G01N 2021/8416; G01N 2021/8472
See application file for complete search history.

(56) References Cited

U.S. PATENT DOCUMENTS

| | | | |
|---|---|---|---|
| 6,741,875 B1* | 5/2004 | Pawluczyk | G01N 21/314 250/339.05 |
| 2006/0225830 A1* | 10/2006 | Kohler | B31F 1/2836 156/470 |
| 2007/0158245 A1* | 7/2007 | Kenny | B07C 5/342 209/576 |
| 2016/0123871 A1 | 5/2016 | Kalwa et al. | |
| 2022/0064403 A1 | 3/2022 | Winterowd | |
| 2022/0161298 A1 | 5/2022 | Kumar et al. | |
| 2022/0205908 A1 | 6/2022 | Amano et al. | |

FOREIGN PATENT DOCUMENTS

EP 3 885 740 A1 9/2021

OTHER PUBLICATIONS

Mitchell et al., "Recycling disposable cups into paper plastic composites," Waste Management, vol. 14, pp. 2113-2119. (Year: 2014).*

* cited by examiner

*Primary Examiner* — Kiho Kim
(74) *Attorney, Agent, or Firm* — FOLEY & LARDNER LLP (57) ABSTRACT

A method may include measuring, by an NIR device, a first near-infrared (NIR) spectrum at an edge of a composite panel formed using a blend of paper fragments and plastic fragments, measuring, by the NIR device, a second NIR spectrum at the edge of the composite panel, aggregating, by a controller of the NIR device, the first and second spectra to obtain an aggregated spectrum, and comparing the aggregated spectrum to calibration data to determine a plastic composition of the composite panel.

20 Claims, 5 Drawing Sheets

DETERMINING CELLULOSE AND PLASTIC RATIOS USING NEAR-INFRARED SPECTROSCOPY ALONG THE EDGE OF COMPOSITE PANELS

CROSS-REFERENCE TO RELATED PATENT APPLICATION

This application claims the benefit under 35 U.S.C. § 119(e) of U.S. provisional application No. 63/407,240, entitled "METHOD FOR DETERMINING CELLULOSE AND PLASTIC RATIOS USING NEAR-INFRARED SPECTROSCOPY ALONG THE EDGE OF COMPOSITE PANELS," filed Sep. 16, 2022, which is incorporated herein by reference in its entirety.

BACKGROUND

Products made from recycled goods are often made using materials that are harvested from waste materials, sorted, washed, dried, and treated to produce pure base materials with which to manufacture products. Products made from recycled paper and plastic generally require a specific ratio of paper and plastic.

SUMMARY

Aspects of the present disclosure are directed to a method including measuring, by a near-infrared (NIR) device, a first NIR spectrum at an edge of a composite panel formed using a blend of paper fragments and plastic fragments, measuring, by the NIR device, a second NIR spectrum at the edge of the composite panel, aggregating, by a controller of the NIR device, the first and second NIR spectra to obtain an aggregated spectrum, and comparing, by the controller of the NIR device, the aggregated spectrum to calibration data to determine a plastic composition of the composite panel.

The method may include determining a paper/plastic ratio of the composite panel based on the plastic composition of the composite panel. In the method, the first NIR spectrum and the second NIR spectrum may be measured at different locations on the edge of the composite panel. In the method, the first NIR spectrum and the second NIR spectrum may be measured as the composite panel passes by the NIR device. The method may include determining a composition of a first type of plastic of the plastic composition and a composition of a second type of plastic of the plastic composition. The method may include measuring a plurality of NIR spectra at a predetermined frequency and aggregating the plurality of NIR spectra to obtain the aggregated spectrum. The method may include adjusting a metering of materials to produce a second composite panel based on the determined plastic composition of the composite panel. The method may include adjusting a sorting of materials to produce a second composite panel based on the determined plastic composition of the composite panel.

Aspects of the present disclosure are directed to a system including a near-infrared (NIR) device, and a controller of the NIR device, the controller configured to measure, using the NIR device, a first NIR spectrum at an edge of a composite panel formed using a blend of paper fragments and plastic fragments, measure, using the NIR device, a second NIR spectrum at the edge of the composite panel, aggregate the first and second NIR spectra to obtain an aggregated spectrum, and compare the aggregated spectrum to calibration data to determine a plastic composition of the composite panel. The controller may be further configured to determine a paper/plastic ratio of the composite panel based on the plastic composition of the composite panel. The controller may be further configured to measure, using the NIR device, the first NIR spectrum and the second NIR spectrum at different locations on the edge of the composite panel. The controller may be further configured to measure, using the NIR device, the first NIR spectrum and the second NIR spectrum as the composite panel passes by the NIR device. The controller may be further configured to determine a composition of a first type of plastic of the plastic composition and a composition of a second type of plastic of the plastic composition. The controller may be further configured to measure, by the NIR device, a plurality of NIR spectra at a predetermined frequency and aggregate the plurality of NIR spectra to obtain the aggregated spectrum. The controller may be configured to adjust a metering of materials to produce a second composite panel based on the determined plastic composition of the composite panel. The controller may be configured to adjust a sorting of materials to produce a second composite panel based on the determined plastic composition of the composite panel.

Aspects of the present disclosure are directed to a method including generating, by a processor, a calibration curve for determining a plastic composition of a composite panel based on near-infrared (NIR) measurements, measuring, using an NIR device, an NIR spectrum at an edge of a target composite panel formed using a blend of paper fragments and plastic fragments, and determining, by the processor, a plastic content of the target composite panel by comparing the measured spectrum to the calibration curve.

In the method, generating the calibration curve may include associating, by the processor, a first measured NIR spectrum with a first plastic composition and associated a second measured NIR spectrum with a second plastic composition. The method may include aggregating, by the processor, a first plurality of NIR spectra to generate the first measured NIR spectrum, and aggregating, by the processor, a second plurality of NIR spectra to generate the second measured NIR spectrum. The method may include measuring, using the NIR device, the first measured NIR spectrum at an edge of a first composite panel having the first plastic composition, and obtaining, by the processor, the first plastic composition of the first composite panel from a destructive test on the first composite panel.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The current disclosure solves the technical problem of determining a paper/plastic ratio of a panel formed from a blend of paper and plastic fragments in a rapid and non-destructive manner. Scanning an edge of the panel with a near-infrared (NIR) device allows for rapid, continuous determination of the paper/plastic ratio of the panel without tearing the panel apart to analyze its contents. The use of an aggregated spectrum generated using NIR scans from multiple points along an edge of the panel allows for the rapid and accurate determination of panel contents, including the paper/plastic ratio. Furthermore, calibrating the NIR device using data from NIR scans performed at the edges of panels with known properties allows for the accurate determination of panel contents from just an edge scan.

A proportion of plastic and cellulose in a panel impacts mechanical properties of a composite panel. Thus, it is useful to have a precise measurement of the amount of plastic and/or cellulose in the composite panel. Currently, no non-destructive and rapid test to measure the plastic or paper content within a finished good is available.

Near-Infrared (NIR) Spectroscopy is a method which may be used in the classification and sorting of polymers. NIR spectrometry may be used to identify paper and plastic materials because each material produces a unique spectroscopic response when exposed to near-infrared light (1000 nm to 2500 nm). NIR technology can be implemented in a quality control capacity to assist in confirming the paper and/or plastic ratio of the finished composite panel. For example, a blend of paper and plastic fragments of a target paper/plastic ratio may be used to form the composite panel. A quality control NIR scan of the composite panel may serve to confirm the paper/plastic ratio of the composite panel or identify issues with the blend and/or forming process. For example, the blend of paper and plastic fragments may be measured using a first NIR device and adjusted to obtain the target paper/plastic ratio before forming the composite panel. If the NIR edge scan shows that the composite panel does not have the target paper/plastic ratio, the preliminary NIR device may be adjusted to more accurately measure the paper/plastic ratio of the blend of paper and plastic fragments. In some embodiments, NIR technology may be implemented as part of a feedback or control loop that provides information for accurate metering raw materials used to produce the composite panel. For example, the composite panel may be formed from a blend of paper and plastic fragments obtained by metering paper fragments from a paper fragments bin and plastic fragments from a plastic fragments bin to obtain the target paper/plastic ratio.

Edge scans of formed composite panels may be used as feedback to adjust the metering from the paper fragments bin and the plastic fragments bin to obtain the target paper/plastic ratio in finished composite panels.

The process of determining the paper/plastic ratio of the composite panel may utilize a near-infrared spectrometer and a computer program which, when given an aggregated spectrum gathered from numerous points along the exposed edge of a composite panel, determines the percent composition of plastic and/or paper in a sample. The paper may be any cellulose-containing material. In some embodiments, the plastic may be polyethylene.

Figure 1:
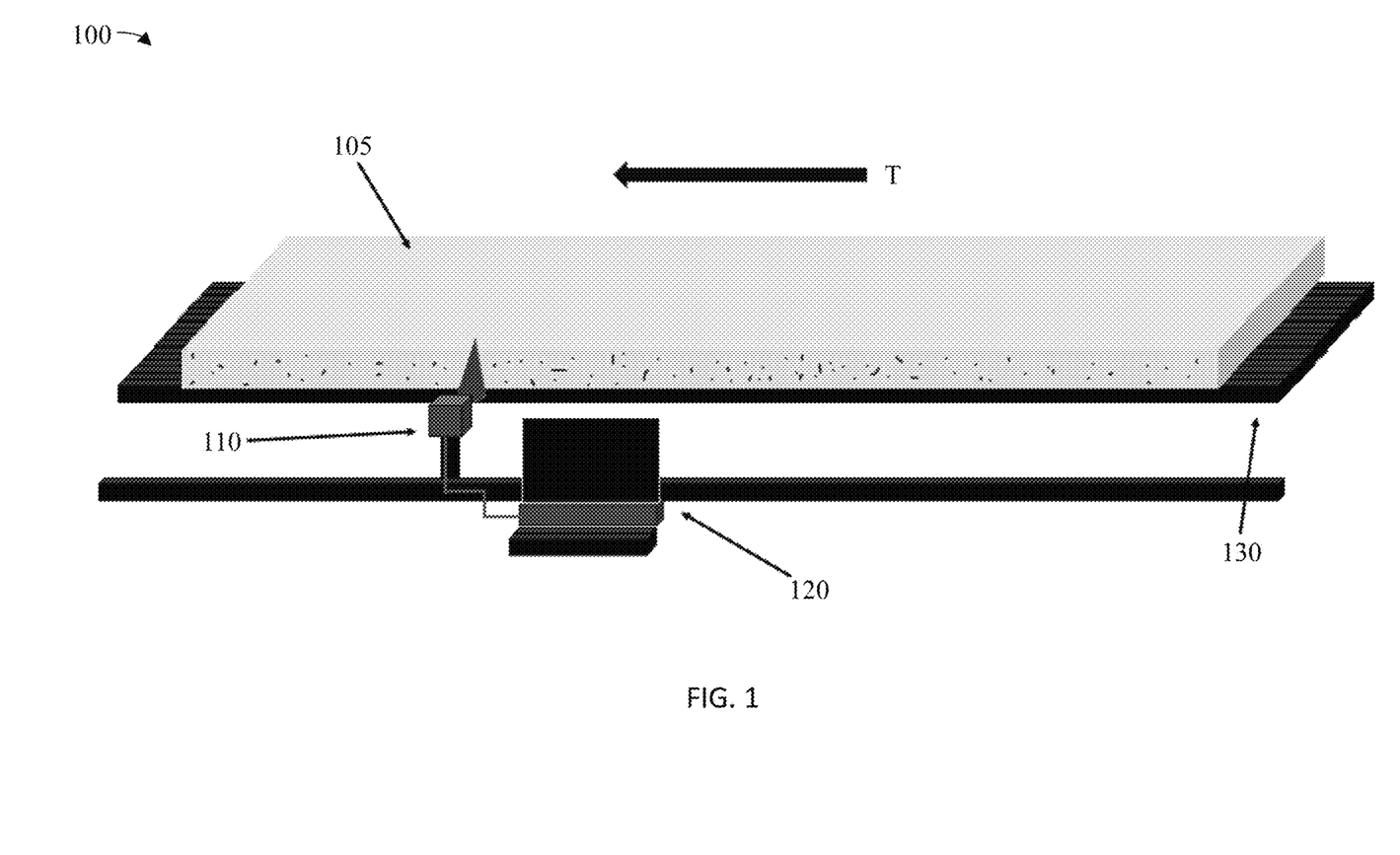
FIG. 1 illustrates a system for determining a composition of a composite panel using a near-infrared (NIR) device.

FIG. 1 illustrates a system 100 for determining a composition of a composite panel 105 using a near-infrared (NIR) device 110. The system 100 includes the NIR device 110 and a controller of the NIR device 120. The system 100 may include a conveyor 130 which carries the composite panel 105 past the NIR device 110.

The composite panel 105 may include paper and plastic fragments. The paper and plastic fragments may be raw materials harvested from waste materials. The paper and plastic fragments may be fed through a press or extruder to form the composite panel 105. The paper fragments may be any material including cellulose. The plastic fragments may be polyethylene, polyethylene terephthalate (PET), polypropylene (PP), or any other plastic material. In some embodiments, the composite panel 105 may be homogenous, allowing for a paper/plastic ratio of the composite panel 105 to be determined based on measurements taken at an edge of the composite panel 105.

The composite panel 105 may pass by the NIR device 110 as the composite panel 105 is carried on the conveyor 130. In some embodiments, the NIR device 110 may move relative to the composite panel 105. In some embodiments, the NIR device 110 may continually scan the edge of the composite panel 105. In other embodiments, the NIR device 110 may scan the edge of the composite panel 105 at one or more points along the edge of the composite panel. The NIR device 110 may scan the composite panel periodically or at a predetermined frequency. In an example, the NIR device 110 may record a spectrum having wavelengths from 400 nm to 2500 nm approximately every 100 milliseconds. In some embodiments, the NIR device 110 may scan the edge of the composite panel 105 for an entire length of the composite panel 105. In other embodiments, the NIR device 110 may scan the edge of the composite panel 105 for a portion of the length of the composite panel 105.

The captured spectra may be recorded and aggregated by the controller 120. The controller 120 may be a computer. The controller 120 may include a processor and a memory. The controller 120 may include instructions stored in a non-transitory, computer-readable medium which, when executed by the processor, cause the processor to perform methods and processes disclosed herein. For example, the processor may execute the instructions to record the measured spectra in the memory, aggregate the spectra to generate an aggregated spectrum, and record the aggregated spectrum in the memory. The controller 120 may compare the information gathered by scanning the edge of the panel against calibration curves of known compositions to establish a fit to a specific composition. The controller 120 may compare the aggregated spectrum to calibration curves of known paper/plastic ratios to determine a paper/plastic ratio of the composite panel 105. In an example, the controller 120 may determine that the composite panel 105 is 60% plastic and 40% paper based on the aggregated spectrum fitting a calibration curve of 60% plastic and 40% paper.

Figure 2:
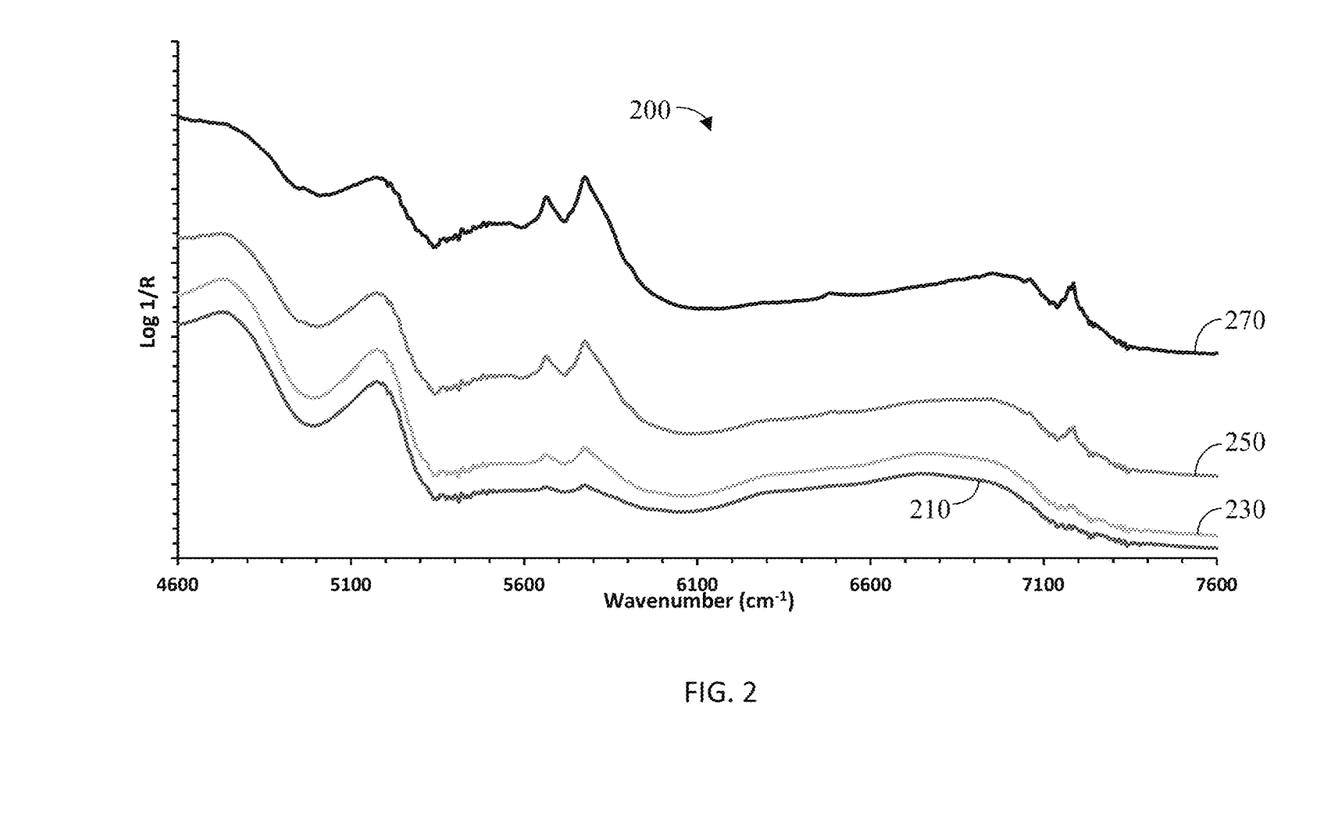
FIG. 2 illustrates example aggregated NIR spectra of composite panels having various paper/plastic ratios.

Calibration curves may be obtained by aggregating blended NIR spectra of paper and plastic at known ratios, as discussed in conjunction with FIG. 2.

The known ratios and corresponding aggregate spectra can be input into a PLC (programmable logic controller) to control processes such as the metering or sorting of paper and plastic. Using a standard control loop connected to the PLC, a rate of raw materials being fed into a forming mat can be adjusted based on an observed paper/plastic ratio in the composite panel 105. For example, a rate of paper fragments and a rate of plastic fragments fed into the forming mat may be adjusted if an observed paper/plastic ratio of the composite panel 105 is outside a target ratio. The control loop may continuously compensate for a change in expected materials being fed from a sorting process. The sorting process may be adjusted based on the observer paper/plastic ratio in the composite panel 105. In some embodiments, the controller 120 may adjust the rate of materials and/or the sorting of materials based on the observed ratio. In other embodiments, the controller 120 may transmit the observed ratio to a metering controller for metering a flow rate of materials, a sorting controller for adjusting the sorting of materials, or a central controller. The adjusted rate of materials and/or the adjusted sorting of materials may be used to provide paper and plastic fragments to the forming mat to produce a second composite panel. The observed ratio of the composite panel 105 may thus be used to adjust a paper/plastic ratio in the second composite panel.

Another notable feature of the described embodiments is the ability to include more materials into the calibration curves. This allows the NIR device 110 and controller 120 to report percent compositions for a greater number of materials. The controller 120 may fit the aggregated spectrum to a calibration curve of a library of calibration curves. The library of calibration curves may include calibration curves of combinations of different materials at different compositions. The library of calibration curves may be stored in the memory of the controller 120. Examples of materials that can be quantified using this method include but are not limited to polyethylene terephthalate (PET), polypropylene (PP), and other polymers along with cellulose and polyethylene (PE). The controller 120 may determine a composition of a first type of plastic of the plastic composition of the composite panel 105 and a composition of a second type of plastic of the plastic composition of the composite panel 105. For example, the controller 120 may determine that the composite panel 105 is 60% plastic and 40% cellulose and that 50% of the plastic of the composite panel 105 is PET and 50% of the plastic of the composite panel 105 is PP such that the composite panel 105 is 30% PET, 30% PP, and 40% cellulose. In some embodiments, the controller 120 may select a subset of the library of calibration curves based on an expected makeup of the composite panel 105. In other embodiments, the controller 120 may determine a makeup of the composite panel 105 based on a fit of the aggregated spectrum to a calibration curve of the library of calibration curves.

This process may also be paired with a paper and/or plastic sorting system and have the calculated percent compositions of the panels being compared to the paper/plastic being sent into a conversion process via a ratio control system as discussed herein.

FIG. 2 illustrates example aggregated NIR spectra 200 of composite panels having various paper/plastic ratios. The y-axis of the spectra 200 is intensity and the x-axis is wavenumber ($cm^{-1}$). The spectra 200 may be measured by the controller 120 of FIG. 1. The spectra 200 may include a first spectrum 210 of a first composite panel including 10% plastic. The spectra 200 may include a second spectrum 230 of a second composite panel including 30% plastic. The spectra 200 may include a third spectrum 250 of a third composite panel including 50% plastic. The spectra 200 may include a fourth spectrum 270 of a fourth composite panel including 70% plastic. Each of the spectra 210-270 may be an aggregated spectrum generated by aggregating a plurality of spectra measured along the edge of the respective composite panel. A change in signal intensity between different panels having different paper/plastic ratios observed by a NIR device may correspond to different amounts of plastic and/or paper on the edge of composite panels.

The controller 120 may use the intensity (y-axis) of the signals at specific wavenumbers unique to materials to correlate the paper/plastic ratio to the aggregate NIR spectrum. For example, a peak at 5800 cm' increases in intensity in proportion to an increased plastic composition. Thus, the fourth spectrum 270 of a composite panel having 70% plastic has a higher peak at 5800 cm' than the third spectrum 250 of a composite panel having 50% plastic, which has a higher peak at 5800 cm' than the second spectrum 230 of a composite panel having 30% plastic, which has a higher peak at 5800 cm' than the first spectrum 210 of a composite panel having 10% plastic. The controller 120 may fit a measured spectrum or aggregated spectrum of a composite panel to the spectra 200 to determine a composition of the composite panel. In an example, the controller 120 fits a measured aggregated spectrum of a composite panel to the third spectrum 250 to determine that the composite panel has a plastic composition of 50%. In another example, the controller 120 fits a measured aggregated spectrum of a composite panel between the third spectrum 250 and the fourth spectrum 270 to determine that the composite panel has a plastic composition of 60%, based on a linear relationship between the measure spectrum and plastic composition.

Figure 3:
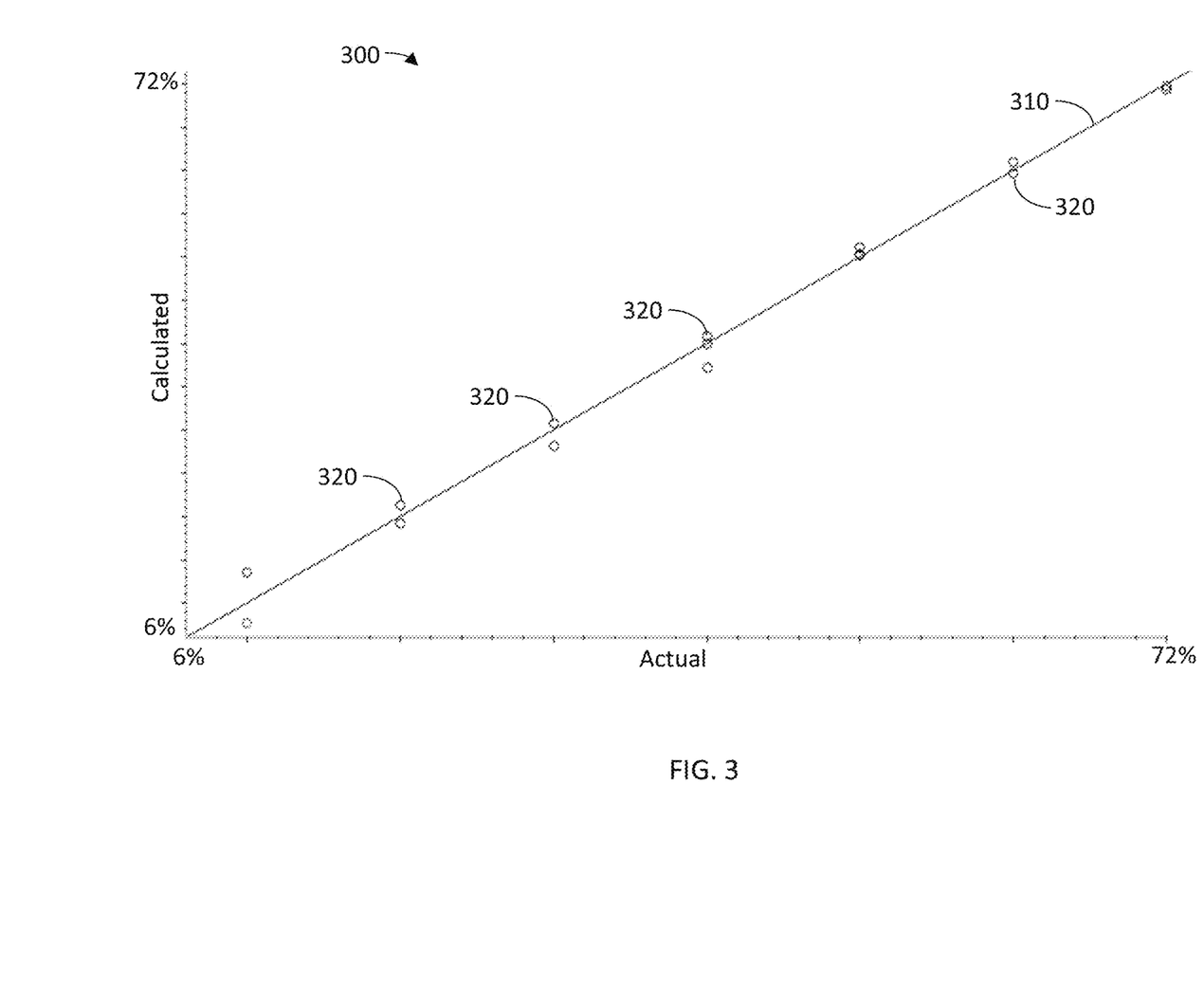
FIG. 3 illustrates a calibration curve of an NIR device.

FIG. 3 illustrates an example graph 300 showing a calibration curve 310 of an NIR device. The x-axis of the graph 300 may the known, or actual compositions of calibration panels, and the y-axis of the graph may be the calculated percent composition from the NIR device or controller of the NIR device. The graph 300 may include a plurality of calibration points 320. The calibration curve 310 may be generated by the controller 120 of FIG. 1. The calibration curve 310 may be used by the controller 120 of FIG. 1 to determine a composition of a composite panel. The graph 300 compares actual and calculate plastic compositions of composite panels from 6% to 72% plastic. The graph 300 is provided as an example, and similar graphs may be used to show calibration curves for different materials and for different percent compositions.

The calibration curve 310 may be an experimentally determined calibration curve obtained by producing calibration panels having various paper/plastic ratios. Each calibration panel may be scanned at multiple points along an edge of the calibration panel by an NIR device, such as the NIR device 110 of FIG. 1. The output spectra recorded at the multiple points of each respective calibration panel may be averaged together to give an aggregate spectrum of paper and plastic for the respective calibration panel. In some embodiments, the aggregate spectra of the calibration panels may include the spectra 200 of FIG. 2. In an example, an aggregate spectrum is an aggregate spectrum of polyethylene and cellulose. The aggregate spectra of the calibration panels may be used to calculate compositions of the calibration panels, such as plastic compositions. A destructive test may be used to determine the known, or actual compositions of the calibration panels. The actual compositions of the calibration panels may be associated with the calculated compositions to generate the plurality of calibration points 320. The calibration curve 310 may be a curve fit to the calibration points 320. The calibration curve 310 may be any kind of fit. In an example, the calibration curve 310 is a linear fit.

Figure 4:
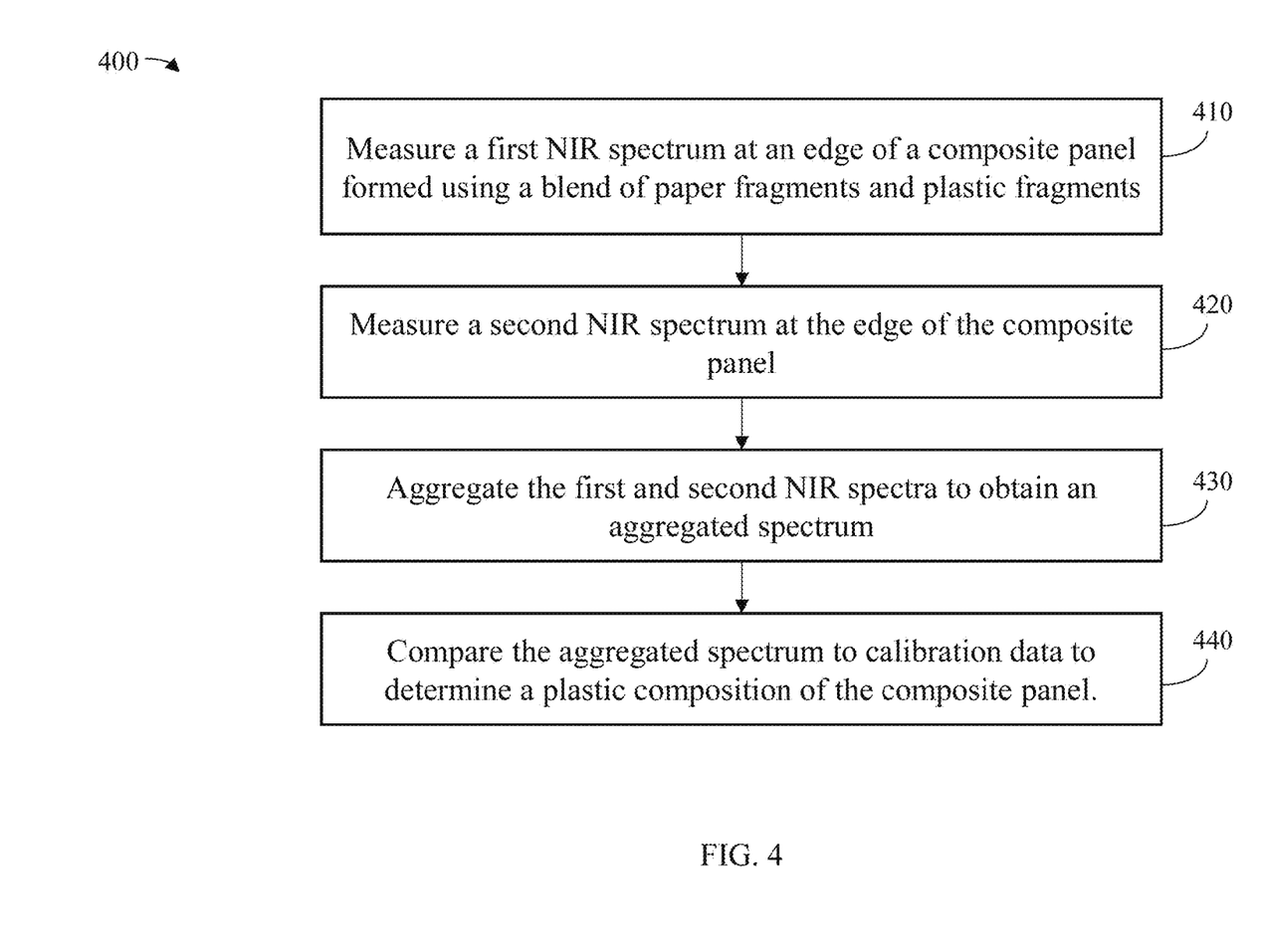
FIG. 4 illustrates an example method for determining a plastic composition of a composite panel using an NIR device.

FIG. 4 illustrates operations of an example method 400 for determining a paper/plastic composition of a composite panel using an NIR device. The method 400 may include more, fewer, or different operations than shown. The operations may be performed in the order shown, a different order, or concurrently. The method 400 may be performed by one or more components of the system 100 of FIG. 1.

At operation 410, a first NIR spectrum is measured at an edge of a composite panel formed using a blend of paper fragments and plastic fragments. The first NIR spectrum may be measured by a controller using an NIR device such as the controller 120 and the NIR device 110 of FIG. 1.

At operation 420, a second NIR spectrum is measured at the edge of the composite panel. The second NIR spectrum may be measured by a controller using an NIR device, such as the controller 120 and the NIR device 110 of FIG. 1. The second NIR spectrum may be measured at a different location than the first NIR spectrum. The first and second NIR spectra may be measured as the composite panel passes by the NIR device. The first and second NIR spectra may be included in a plurality of spectra measured along the edge of the composite panel. The plurality of spectra may be measured at a predetermined frequency, such as every 100 milliseconds.

At operation 430, the first and second NIR spectra are aggregated to obtain an aggregated spectrum. The first and second NIR spectra may be aggregated by an NIR device or a controller, such as the controller 120 and the NIR device 110 of FIG. 1. Aggregating the first and second NIR spectra may include mathematically adding the first and NIR spectra to obtain the aggregated spectrum. In some embodiments, the aggregated spectrum is obtained by aggregating the plurality of spectra. In some embodiments, aggregating the plurality of spectra includes adding spectra to the aggregated spectrum as the plurality of spectra are measured.

At operation 440, the aggregated spectrum is compared to calibration data to determine a plastic composition of the composite panel. The aggregated spectrum may be compared to the calibration data by an NIR device or a controller, such as the controller 120 and the NIR device 110 of FIG. 1. Comparing the aggregated spectrum to the calibration data may include fitting the aggregated spectrum to a spectrum of the calibration data. Comparing the aggregated spectrum to the calibration data may matching the aggregated spectrum to a spectrum of the calibration data. Comparing the aggregated spectrum to the calibration may include comparing one or peaks to peaks of spectra of the calibration data. Comparing the aggregated spectrum to the calibration data may include calculating the plastic composition of the composite panel based on a calibration curve of the calibration data.

The method 400 may include determining a paper/plastic ratio of the composite panel based on the plastic composition of the composite panel. In some embodiments, the composite panel is substantially only paper and plastic. The paper/plastic ratio may be determined based on the aggregated spectrum. The method 400 may include determining a composition of a first type of plastic of the plastic composition and a composition of a second type of plastic of the plastic composition. In some embodiments, the calibration data may include spectra of composite panels including the first type and second type of plastic. The aggregated spectrum may be compared to the calibration data to determine the composition of the composite panel, including the compositions of the first and second types of plastic. In some embodiments, the aggregated spectrum may be compared to the calibration data to determine which materials are present in the composite panel and/or the compositions of the materials.

The method 400 may include adjusting a manufacturing process of composite panels based on the determined plastic composition of the composite panel. In some embodiments, a metering of materials is adjusted to adjust a composition of a second composite panel based on the determined plastic composition of the composite panel. In some embodiments, a sorting of materials is adjusted to adjust a composition of a second composite panel based on the determined plastic composition of the composite panel.

Figure 5:
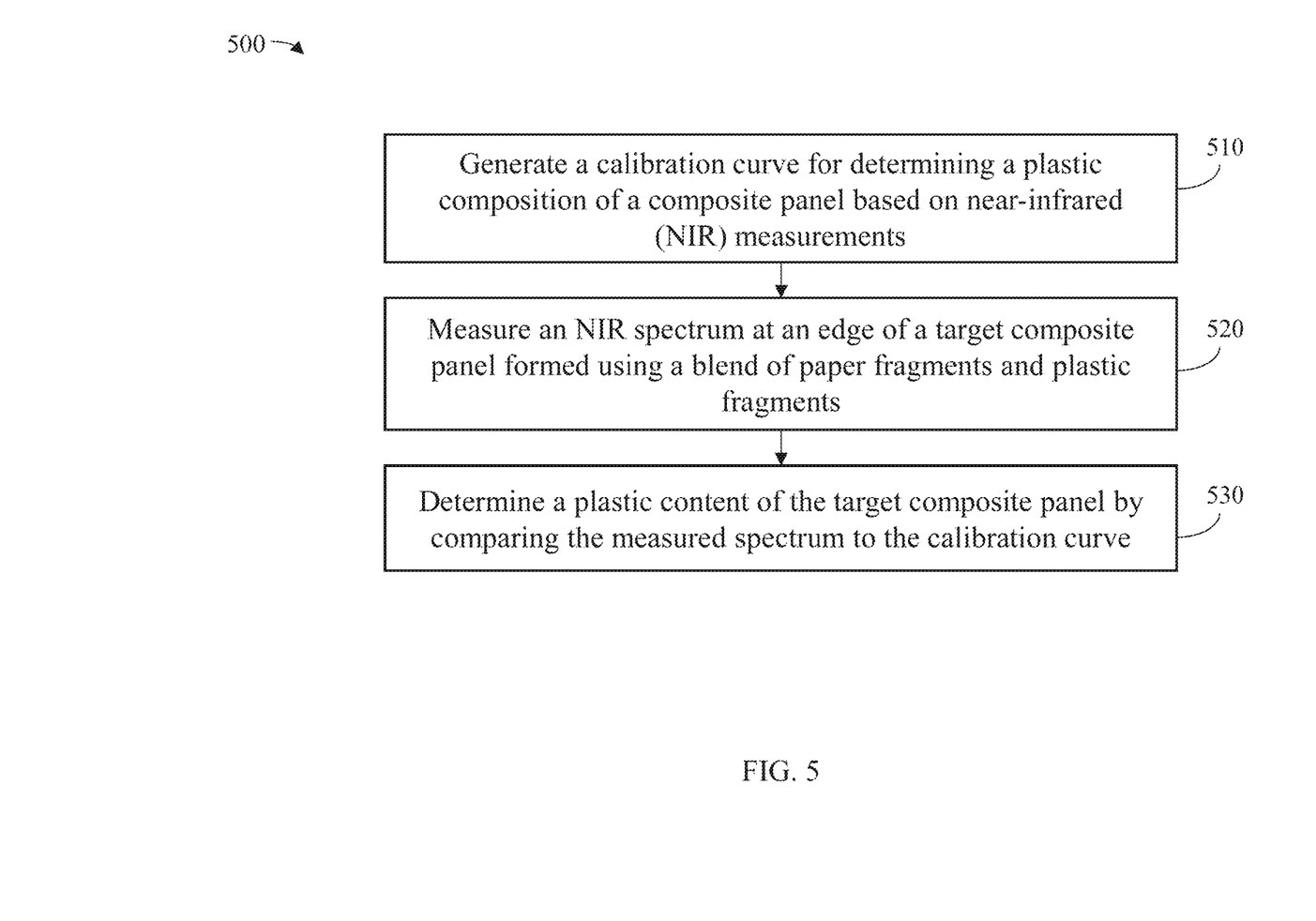
FIG. 5 illustrates an example method for generating a calibration curve for determining a plastic composition of a composite panel using an NIR device.

FIG. 5 illustrates an example method 500 for generating a calibration curve for determining a plastic composition of a composite panel using an NIR device. The method 500 may include more, fewer, or different operations than shown. The operations may be performed in the order shown, a different order, or concurrently. The method 500 may be performed by one or more components of the system 100 of FIG. 1.

At operation 510, a calibration curve is generated for determining a plastic composition of a composite panel. The calibration curve may be generated using spectra of calibration panels of known compositions. A first measured NIR spectrum of a calibration panel having a first plastic composition may be associated with the first plastic composition. A first calibration point may be based on the associated first measured NIR spectrum and first plastic composition. A second measured NIR spectrum of a calibration panel having a second plastic composition may be associated with the second plastic composition. A second calibration point may be based on the associated second measured NIR spectrum and second plastic composition. The calibration curve may be a fit to a plurality of calibration points including the first and second calibration points. The first and second measured NIR spectra may be aggregated spectra, as discussed herein. The first and second plastic compositions may be obtained from destructive tests of their respective composite panels.

At operation 520, an NIR spectrum is measured at an edge of a target composite panel formed using a blend of paper fragments and plastic fragments. The NIR spectrum may be measured by a controller using an NIR device, such as the controller 120 and the NIR device 110 of FIG. 1. In some embodiments, the NIR spectrum may be an aggregated NIR spectrum aggregated from a plurality of points on the edge of the target composite panel.

At operation 530, a plastic content of the target composite panel is determined by comparing the measured spectrum to the calibration curve. The measured spectrum may be compared to the calibration curve by an NIR device or a controller, such as the controller 120 and the NIR device 110 of FIG. 1. Comparing the measured spectrum to the calibration curve may include fitting the measured spectrum to the calibration curve. Comparing the measured spectrum to the calibration curve may include calculating the plastic content of the target composite panel based on the measured spectrum and the calibration curve. Comparing the measured spectrum to the calibration curve may include comparing a response value of the measured spectrum to the calibration curve.

NON-LIMITING EXAMPLES

Example 1. A method for determining the percentage of cellulose and/or plastic in a composite panel by continuously measuring along the exposed edge of the composite using near-infrared (NIR) spectroscopy.

Example 2. The method of example 1 wherein numerous near-infrared spectra are continuously aggregated together in a software program to report a percent composition.

Example 3. The method of example 1 wherein the percent composition of polyethylene in a composite panel can be determined.

Example 4. The method of example 1 wherein the percent composition of cellulose in a composite panel can be determined.

Example 5. The method of example 1 where the percent composition of other polymeric materials can be quantified alongside polyethylene and cellulose.

Example 6. The method of example 1 where the information is used via a control loop to manage metering of materials leading into a conversion process.

Example 7. The method of example 1 where the information is used to compare with a paper/plastic sorting system and confirm the amount of raw materials being sent into a conversion process.

Example 8. The method of example 1 where an experimentally derived calibration curve is developed from known composite panels of various plastic and cellulosic fiber ratios.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:
1. A method comprising:
measuring, by a near-infrared (NIR) device, a first NIR spectrum at an edge of a composite panel formed using a blend of paper fragments and plastic fragments;
measuring, by the NIR device, a second NIR spectrum at the edge of the composite panel, wherein the first NIR spectrum and the second NIR spectrum are measured at different locations on the edge of the composite panel;

aggregating, by a controller of the NIR device, the first and second NIR spectra to obtain an aggregated spectrum; and comparing, by the controller of the NIR device, the aggregated spectrum to calibration data to determine a plastic composition of the composite panel.

2. The method of claim 1, further comprising determining a paper/plastic ratio of the composite panel based on the plastic composition of the composite panel.

3. The method of claim 1, wherein the first NIR spectrum and the second NIR spectrum are measured as the composite panel passes by the NIR device.

4. The method of claim 1, further comprising determining a composition of a first type of plastic of the plastic composition and a composition of a second type of plastic of the plastic composition.

5. The method of claim 1, further comprising measuring a plurality of NIR spectra at a predetermined frequency and aggregating the plurality of NIR spectra to obtain the aggregated spectrum.

6. The method of claim 1, further comprising adjusting a metering of materials to produce a second composite panel based on the determined plastic composition of the composite panel.

7. The method of claim 1, further comprising adjusting a sorting of materials to produce a second composite panel based on the determined plastic composition of the composite panel.

8. A system comprising:
a near-infrared (NIR) device; and
a controller of the NIR device, the controller configured to:
measure, using the NIR device, a first NIR spectrum at an edge of a composite panel formed using a blend of paper fragments and plastic fragments;
measure, using the NIR device, a second NIR spectrum at the edge of the composite panel;
measure, using the NIR device, the first NIR spectrum and the second NIR spectrum at different locations on the edge of the composite panel;
aggregate the first and second NIR spectra to obtain an aggregated spectrum; and
compare the aggregated spectrum to calibration data to determine a plastic composition of the composite panel.

9. The system of claim 8, wherein the controller is further configured to determine a paper/plastic ratio of the composite panel based on the plastic composition of the composite panel.

10. The system of claim 8, wherein the controller is further configured to measure, using the NIR device, the first NIR spectrum and the second NIR spectrum as the composite panel passes by the NIR device.

11. The system of claim 8, wherein the controller is further configured to determine a composition of a first type of plastic of the plastic composition and a composition of a second type of plastic of the plastic composition.

12. The system of claim 8, wherein the controller is further configured to measure, by the NIR device, a plurality of NIR spectra at a predetermined frequency and aggregate the plurality of NIR spectra to obtain the aggregated spectrum.

13. The system of claim 8 wherein the controller is further configured to adjust a metering of materials to produce a second composite panel based on the determined plastic composition of the composite panel.

14. The system of claim 8, wherein the controller is further configured to adjust a sorting of materials to produce a second composite panel based on the determined plastic composition of the composite panel.

15. A method comprising:
generating, by a processor, a calibration curve for determining a plastic composition of a composite panel based on near-infrared (NIR) measurements by associating a first measured NIR spectrum with a first plastic composition and associated a second measured NIR spectrum with a second plastic composition;
measuring, using an NIR device, an NIR spectrum at an edge of a target composite panel formed using a blend of paper fragments and plastic fragments;
determining, by the processor, a plastic content of the target composite panel by comparing the measured spectrum to the calibration curve.

16. The method of claim 15, further comprising:
aggregating, by the processor, a first plurality of NIR spectra to generate the first measured NIR spectrum; and
aggregating, by the processor, a second plurality of NIR spectra to generate the second measured NIR spectrum.

17. The method of claim 15, further comprising:
measuring, using the NIR device, the first measured NIR spectrum at an edge of a first composite panel having the first plastic composition; and
obtaining, by the processor, the first plastic composition of the composite from a destructive test on the first composite panel.

18. The method of claim 15, further comprising determining a composition of a first type of plastic of the first plastic composition and a composition of a second type of plastic of the second plastic composition.

19. The method of claim 15, further comprising adjusting a metering of materials to produce a second composite panel based on the determined plastic composition of the composite panel.

20. The method of claim 15, further comprising adjusting a sorting of materials to produce a second composite panel based on the determined plastic composition of the composite panel.

\* \* \* \* \*